United States Patent [19]

Ruis et al.

[11] 4,235,437
[45] Nov. 25, 1980

[54] ROBOTIC EXERCISE MACHINE AND METHOD

[76] Inventors: David A. Ruis, 1904 Glenwood Ave., Atlanta, Ga. 30316; Russell W. Polhemus, 1775 Creat Trail, Smyrna, Ga. 30080; Wayne J. Book, 431 Hardendorf Ave., Atlanta, Ga. 30307

[21] Appl. No.: 921,568

[22] Filed: Jul. 3, 1978

[51] Int. Cl.$^3$ .............................................. A63B 21/24
[52] U.S. Cl. .................... 272/134; 272/129; 272/130
[58] Field of Search ............... 272/93, 129, 130, 134, 272/DIG. 4, DIG. 5, DIG. 6; 13/379; 235/92 GA; 364/410

[56] References Cited

U.S. PATENT DOCUMENTS

| | | | |
|---|---|---|---|
| 3,395,698 | 8/1968 | Morehouse | 272/73 X |
| 3,572,700 | 3/1971 | Mastropaolo | 272/129 |
| 3,750,479 | 8/1973 | Gause et al. | 272/129 X |
| 3,770,267 | 11/1973 | McCarthy | 272/134 |
| 3,848,467 | 11/1974 | Flavell | 272/DIG. 6 |
| 3,858,873 | 1/1975 | Jones | 272/134 |
| 3,869,121 | 3/1975 | Flavell | 272/129 |
| 3,912,265 | 10/1975 | Muir | 272/130 |
| 3,989,240 | 11/1976 | Victor et al. | 272/134 |
| 4,050,310 | 9/1977 | Keiser | 272/130 |
| 4,063,726 | 12/1977 | Wilson | 272/130 |

OTHER PUBLICATIONS

*Iron Man;* "'Time Machines' by Nautilus," Jul. 1973; pp. 42, 48–50.

*Primary Examiner*—Vance Y. Hum
*Attorney, Agent, or Firm*—Jones, Thomas & Askew

[57] ABSTRACT

An automatically controlled exercise machine which is intended to produce optimal development of skeletal muscle strength for athletic purposes and in physical rehabilitation. The mechanical configuration of this machine is based on a linkage comprised of a series of links connected together so as to allow movement of each link relative to another. Each link is provided with a separate powering device which drives it relative to another link. This linkage interacts with the user by means of various removable attachments located on the outermost link. These independent powering devices are controlled by a feedback control system, so that the user interaction point moves along any specified path in response to forces exerted by the user, and simultaneously provides resisting forces which vary in any desired manner according to position, speed, time, and user-exerted forces.

22 Claims, 18 Drawing Figures

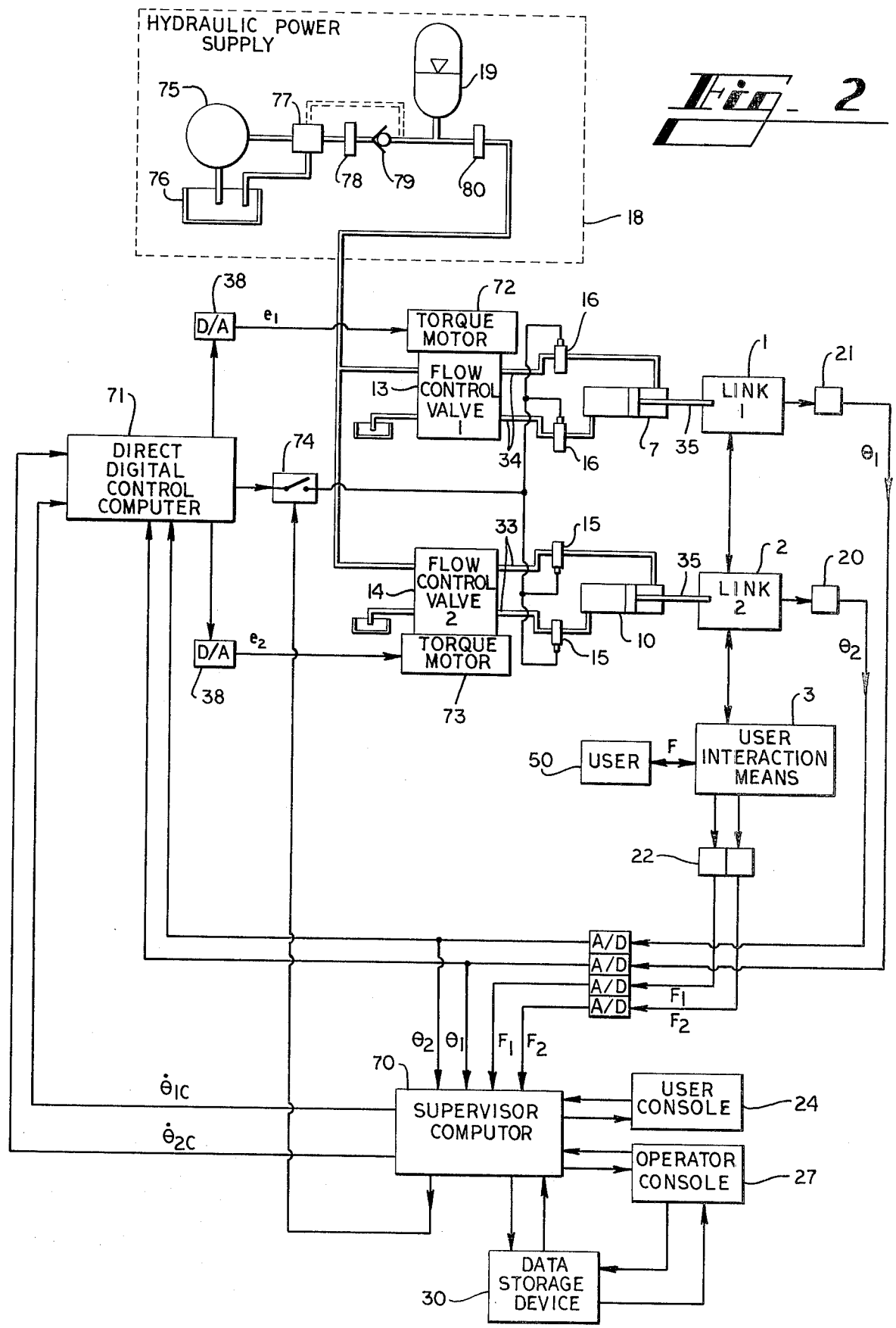

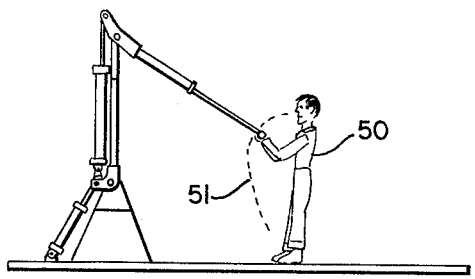
FIG_ 4A
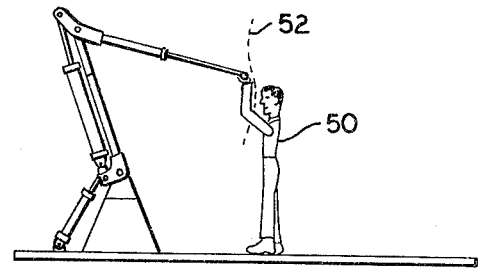
FIG_ 4B
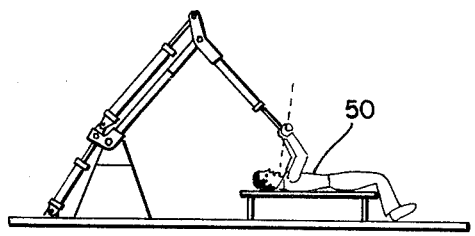
FIG_ 4C
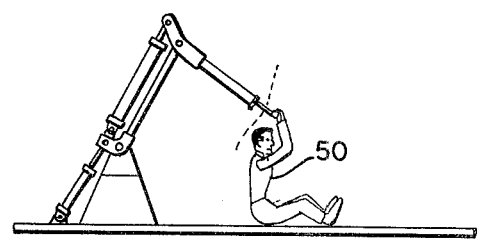
FIG_ 4D
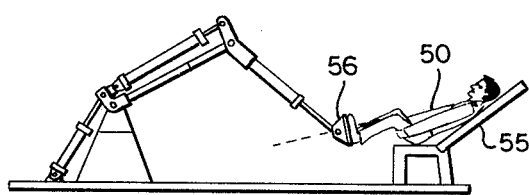
FIG_ 4E
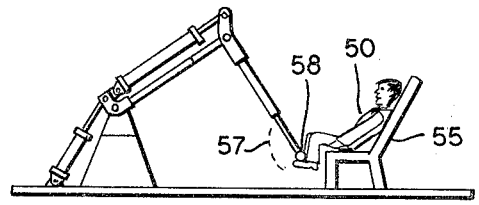
FIG_ 4F
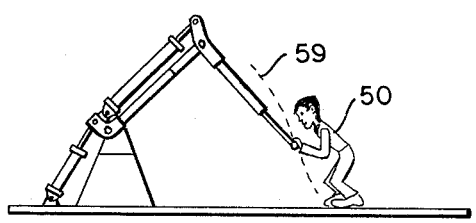
FIG_ 4G
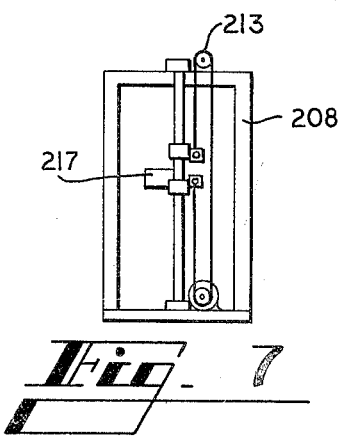
FIG_ 7

ROBOTIC EXERCISE MACHINE AND METHOD

BACKGROUND OF THE INVENTION

Muscular strength is most rapidly developed by using various types of devices and machines which provide forces to resist movement by the user. In order to attain a rate of increase of strength and a level of strength greater than those attainable through participation in most sports and other athletic activities, relatively high resisting forces must be used. The most common presently available means for obtaining high-resistance exercise are the pulley-weight machine, the barbell, spring-action devices, and frictional devices, of both mechanical and fluid type.

The highest levels of muscular size and strength are attained through high-resistance exercise of short duration, involving only a few muscle groups at any one time. Complete isolation of individual muscles or muscle groups during exercise tends to produce the highest rate of increase in muscular strength. Exercise in which the user-exerted force is in a direction opposite to the direction of movement, called "negative exercise", is especially effective in development of strength. It is most effective when used in combination with "positive exercise", in which the user-exerted force and the movement are in the same direction.

The primary biological mechanism by which muscle fibers are induced to grow involves the accumulation of certain chemical by-products produced during intense muscular contraction. These chemicals act as a signal to the cells of the muscle fibers, and result in increases in the quantity of the protein-based muscle tissue. Exercise against light resistance has relatively little effect on muscular strength, but, if sustained for sufficiently long periods of time, it is most effective in increasing muscular endurance.

The amount of force that can be exerted by the arms or legs is highly dependent on their position and angular orientation. It depends both on the direction in which force is being exerted and on the angles of the joints. In order to obtain maximum muscular strength throughout the full range of movement, the resisting forces of an exercise must vary according to the individual's strength potential at any given position along the path of motion. Only a few very expensive machines provide for this kind of variable resistance, and these machines do not provide for variation of the functional relationship between resistance and position. Thus, they do not conform to the individual user's strength-potential curve but only to that of some "average" user. Exercise in which the resisting force does not conform to the user's particular strength-potential curve results in lower development of strength over certain segments of a path of motion as compared to that over other segments. Exercising a muscle in one position only is not effective in increasing strength at other positions.

The starting and finishing positions of an exercise motion are important. A fully extended starting position is necessary to obtain maximum intensity of muscular contraction during the exercise motion. The longest possible path of motion also allows for increases in flexibility. Due to the large variations in physical dimensions among the users, all presently available exercise machines have serious limitations in this respect.

The speed at which an exercise is performed is very important. This is because there are two distinct types of muscle fibers which comprise every skeletal muscle. The red, or slow-twitch, fibers provide forces primarily during slow movements. The white, or fast-twitch, fibers can contract only during relatively fast movements, and are used primarily in high-speed activities such as sprinting or swimming. Muscle performance at high speed cannot be improved by low-speed exercise. Nor can low-speed muscle strength be improved significantly by high-speed exercise. For these reasons, an athlete must train selectively for the particular event or activity in which he specializes.

Exercise done at relatively high speed using relatively high resistance and involving only a few muscles at one time is called isokinetics. Conventional exercise machines which use weights to provide the resisting force are not very well suited for isokinetics. Because weights have inertia, the speed of the exercise will vary greatly throughout the motion, allowing for optimum speeds and resistances only over a short segment of the full range of motion. There are some machines presently available which are primarily intended for isokinetic exercise. Most of them make use of fluid flow through an orifice, sometimes adjustable, to provide exercise in which resisting force is dependent only on speed.

In order to achieve maximum rates of strength increase, muscles must be exercised independently, and with high intensity. In order to maximize strength increases throughout a movement required in some athletic event, or, to be more specific, to maximize the integral of strength with respect to displacement along this path of motion, a high-resistance exercise must be used, and the path of motion must be very similar to that of the movement required in the event. The above facts suggest that there is a need for a machine which provides for variation of paths of exercise motion as well as resisting force. This unique capability is among the most important objectives of the invention.

Most presently available exercise machines do not even come close to providing for maximum rates of strength increase, maximum levels of strength, or optimal degrees of development of the various muscle groups, individual muscles, and parts of individual muscles. No known presently available exercise machine is suited for use by a wide range of individuals, for a wide variety of motions, and for a wide variety of exercise needs.

There is a definite need for greatly improved exercise machines in the medical field of physical rehabilitation. The same principles of muscular strength development apply to victims of accident or disease as to athletes. But rehabilitation patients are in even greater need for highly individualized and carefully regulated exercise. In rehabilitation the objectives are to achieve the greatest possible increases in muscular strength, in specific muscles and movements, in the shortest possible time. In cases involving nerve damage or paralysis a further objective of exercise therapy is the development of nerve pathways to the affected muscles. Recent studies have shown that exercise machines which are capable of actively moving a paralysis patient's arms or legs in a cyclic motion can be of great benefit in partially restoring nerve function.

Exercise equipment for rehabilitation is at about the same state of advancement as athletic equipment. In fact, standard athletics-oriented machines are often used in rehabilitation clinics. In the cases where specialized machines have been built, their effectiveness is highly limited, largely due to the fact that they are suitable for only one very specific exercise.

The complaints about present exercise machines from hospitals and clinics with rehabilitation facilities and from doctors who specialize in this field are numerous and significant. One common problem is that most machines use weights to provide the resisting force. The inertia of the weights allows the patient to throw or jerk the device in order to avoid exercising through regions of extreme weakness, precisely the regions where exercise is most needed. Other problems mentioned are lack of fine enough variation of resisting force, lack of adaptation to the patient's size, no allowance for the adjustment of the variation of resisting force with position, and general lack of adaptability to the individual patient's specific needs.

SUMMARY OF THE INVENTION

This invention is concerned with skeletal-muscle exercise and is intended for application in both athletic training and physical rehabilitation. It involves not merely improvements of existing exercise devices, but a radically different approach to skeletal-muscle exercise. The machine which is the subject of this invention is termed "robotic" for the reason that it possesses a sort of intelligence and a freedom of movement which together enable it to provide totally variable exercise, virtually unlimited as to possible variations of paths of motion, intensity, speed, and form.

The invention is an exercise machine comprising a generally arm-like linkage comprised of two or more links, with independent powering means connected to each link. The term "link" is used in this description and in the claims in its kinematic sense, meaning a structure or body of arbitrary shape and construction which is sufficiently rigid to maintain its shape and which is a member of a movable linkage, or group of links. This linkage interacts with the user by means of hand grips, bars, and various other removable attachments located on the outermost link of the linkage. This point of user interaction will be called the "endpoint".

There are several alternative ways to construct this linkage, within the context of the present invention. The links may be joined together by hinge joints allowing one link to rotate relative to another. They may be joined together by a guideway allowing one link to move in a straight line relative to another. Different pairs of links within a linkage may be joined in either of the above ways.

Each link is driven relative to the link to which it is connected by an independent powering means. The torques or forces supplied by each of these independent powering means are controlled by a feedback control system. By suitable control of these supplied forces the end of the outermost link can be made to move to any position within a large region, and may take any path in getting from one point to another. The linkage is controlled so that the user is able to move the endpoint only along some specified paths. This exercise machine may be programmed to provide any desired path of exercise motion. When a particular path is specified by the user, the control system controls the forces or torques applied to each link of the machine so as to prevent the endpoint from moving to any point other than those points which lie on the curve constituting this specified path of motion. Thus, the specified path of motion is an "allowed trajectory" and all points not on this path are "off limits" to the endpoint.

This process of path programming has the effect of causing the endpoint to respond to user-exerted forces as if the endpoint were constrained to move along a rigid, fixed, mechanical track having the same shape as the specified path of motion. This feature makes this exercise machine capable of duplicating the motion of virtually any mechanism. It is also capable of producing motions which are unattainable by any existing mechanism.

At the same time that the specified trajectory, (path of motion), is being enforced, the speed of movement of the endpoint along this trajectory is being controlled according to the component of user-exerted force tangent to the trajectory at any given position, and in some cases as a function of time as well. The particular functional relationships between the controlled velocity of the endpoint, the component of user-exerted force tangent to the specified trajectory at the present endpoint position, the present endpoint position, and time attainable with this automatically controlled exercise machine are essentially unlimited. For this reason almost any imaginable form of exercise can be attained with this single machine.

In the case where the automatic control system includes a digital computer, as in the preferred embodiment, many additional capabilities exist.

One such capability is the use of the control computer for monitoring and recording the user's performance. This will be useful in athletic training and of even greater value in rehabilitation. This computerized record-keeping will insure that exercises are being performed properly and will provide important data concerning the user's rate of improvement.

The computer will also allow for visual displays which inform the user of his level of performance, both past and present. It can also be programmed to display messages advising or instructing the user on the proper manner of performing various exercises, and to guide him through a sequence of steps required in a particular exercise program.

A path of exercise motion may be specified in several different ways. One way consists of entering coordinates for a large number of points directly into computer memory. By interpolating between any of these coordinate sets, all points on the path of motion are specified with sufficient accuracy. Alternatively, a path of motion may be represented by an approximate mathematical function which is used in the control program to compute the coordinates of any points on this path.

Another method for path programming allows for direct, convenient specification of new or non-standard paths. In this method, called "trajectory teaching", the user specifies a desired path by manually moving the endpoint along this path. The system operates in a special mode during this process. Closely spaced coordinate sets, representing points traversed by the endpoint during manual movement, are automatically entered into computer memory. The resulting table of coordinates may then be converted into approximate mathematical expressions in order to reduce storage requirements.

The relationship between the resisting force produced by the machine and the position of the endpoint along a specified trajectory will correspond to the individual user's strength-potential curve. The machine is programmed to vary the resisting force in accordance with a strength-potential curve by means of a process called "force teaching". In this process the endpoint will be constrained to move only along a particular trajectory previously specified. The endpoint will move along this trajectory at a constant speed while the user exerts his maximum force on the user-interaction means in the direction of movement of the user-interaction means. This maximum force will vary with position along the trajectory, as previously discussed. During this process the user-exerted force is sampled by the control computer at regular intervals of displacement along the trajectory. This force data is used later during exercise to compute the value of resisting force at any position along the trajectory.

The objectives in inventing and developing this robotic exercise machine are to provide an exercise machine which has the following capabilities:

a. provides an unlimited number of different paths of exercise motion, unlimited as to shape or curvature, tailored to individual needs and to specific athletic events or movements;

b. provides for adjustment of the functional relationship between user-exerted force and speed of movement;

c. provides resisting force which varies as a function of position along a path of motion, according to the user's strength-potential curve;

d. provides for adjustment of the functional relationship between resisting force and position along a path of motion;

e. allows for adjustment of all exercise motions according to the physical dimensions of the user;

f. provides a large number of different exercise motions and resistances in comparison to its cost and size;

g. provides for both positive and negative exercise;

h. provides for the adjustment of forces on the negative, (return stroke), portion of an exercise to a different level than that during the positive, (forward stroke), portion;

i. provides for isokinetic exercise;

j. is highly effective in both low-speed strength-building exercise and high-speed isokinetic exercise;

k. provides for automatic reduction of resisting force during the course of an exercise set l. displays instantaneous level of force being exerted;

m. allows for practically infinitely variable or very closely spaced settings of resisting force;

n. allows for quick and easy adjustment of all adjustable components;

o. is capable of operating in an active mode, in which a rehabilitation patient's arms or legs are moved automatically through any path of motion.

BRIEF DESCRIPTION OF THE DRAWINGS

FIG. 2 is a block diagram showing the functional relationships among the components of the machine of FIG. 1, and the control system configuration.

FIGS. 4a–4g illustrate the machine of FIG. 1 in use for various exercise motions and showing linkage positions, user positions, and paths of motion, (dotted lines), corresponding to several examples of different exercises among the infinite number of exercises possible with this machine.

FIG. 7 is a front view of the embodiment shown in FIG. 6.

DETAILED DESCRIPTION

Figure 1:
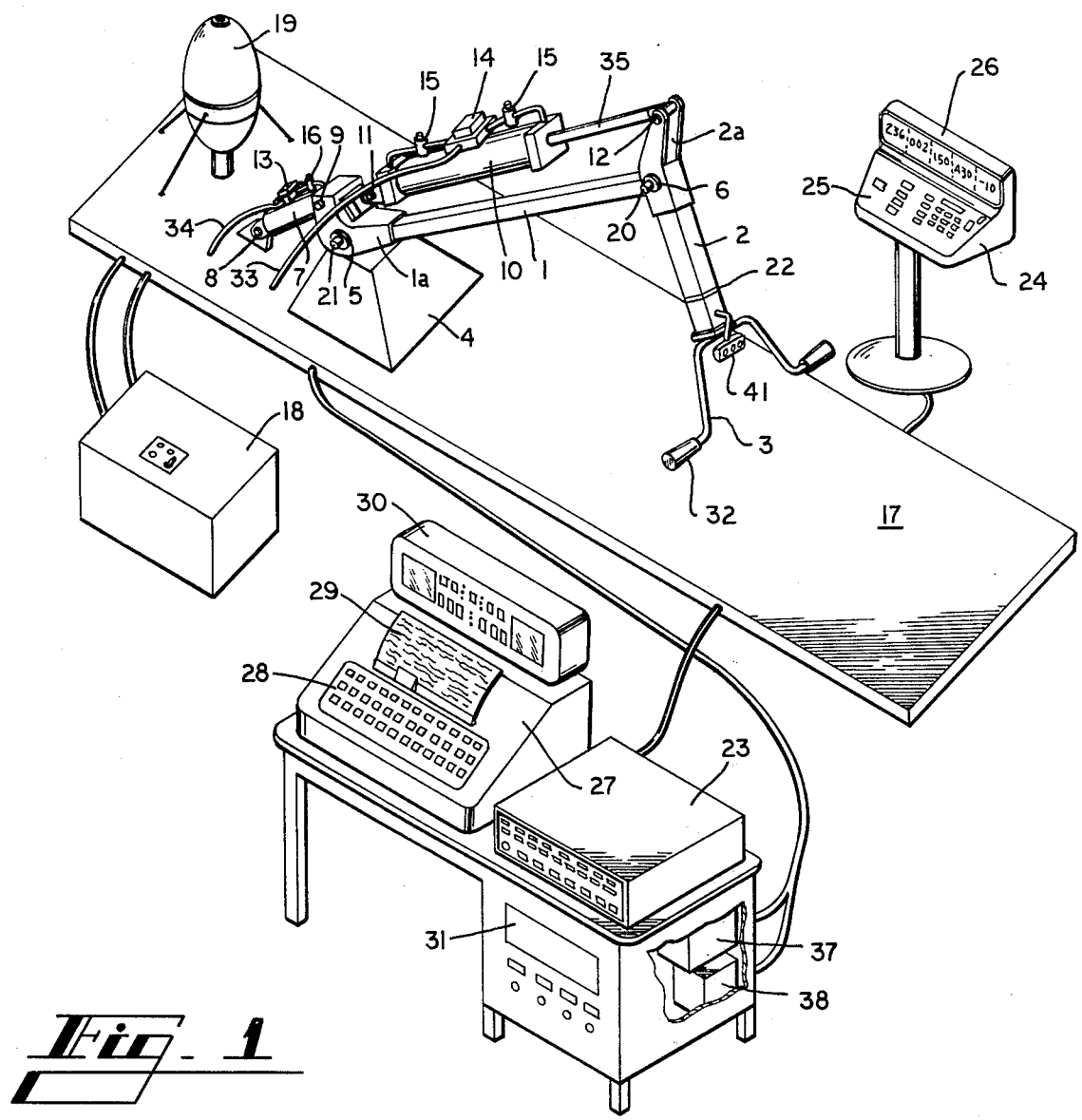
FIG. 1 is a pictorial view of the complete robotic exercise machine and control apparatus according to an embodiment of the present invention.

Referring to FIG. 1, the robotic exercise machine of the first disclosed embodiment has a first link 1 connected to a rigid frame 4 by a hinge joint 5, allowing this first link to rotate relative to the frame. A second link 2 is connected to the first link 1 by a hinge joint 6 allowing this second link to rotate relative to the first link. A yoke-bar 3 is shown mounted at the end of the second link 2 and has a pair of handles 32 which the user of the machine grips with his hands while exercising. This bar 3 is only one of many removable attachments which are available for use as user interaction means for this exercise machine. A few of these other removable attachments are: a pair of foot plates which receive forces exerted by the user's feet, a pair of padded surfaces for direct contact with the user's forearms, and a pair of padded surfaces for direct contact with the user's lower legs. A set of accessory furniture is also available for positioning or mounting on the platform 17, and includes benches, chairs, and various other supporting structures. This platform 17 is rigidly connected to the frame 4. The first link 1 is driven relative to the frame 4 by hydraulic cylinder 7. The second link 2 is driven relative to the first link by hydraulic cylinder 10.

A hydraulic power supply 18 pumps fluid into the accumulator 19, which stores fluid under pressure. This accumulator 19 supplies fluid at high pressure to both cylinders 7 and 10. The flow rates of fluid into cylinder 7 and 10, and hence the speeds of the piston rods 35, are regulated by electro-hydraulic servo valves 13 and 14 respectively. Fluid enters these servo valves 13 and 14 through supply lines 33 and 34. Cylinder 7 is connected to platform 17 by a hinge joint 8, and to the hub 1a of link 1 by a hinge joint 9. Cylinder 10 is connected to the hub 1a of link 1 by a hinge joint 11 and to the hub 2a of link 2 by hinge joint 12. The geometry of the described linkage is such that the user interaction point 32, which is that point at which the body of the user makes contact with the yoke bar 3, can be made to move along any one of an infinite number of paths within a large planar region, at any desired velocity, by suitable control of the angular velocities of the two links 1 and 2. These angular velocities are produced by the motion of piston rods 35 relative to cylinders 7 and 10. Thus, the velocity of the user interaction point 32 is controlled by regulating the flow rates of fluid into cylinders 7 and 10 by means of servo valves 13 and 14.

Suitable control of the velocity of user interaction point 32 makes possible the enforcement of any specified path of motion within a large planar region, and provides for any desired relationship between speed of movement along this path and the magnitudes of user-exerted forces.

The primary element of the control system is a microcomputer 23. This microcomputer 23 supervises operation of the machine and computes velocity commands for the two links 1 and 2. The microcomputer 23 is also a part of the feedback loops which are responsible for carrying out these velocity commands. The following variables are sensed and fed into the microcomputer 23: the angular position of link 1 by transducer 21, the angular position of link 2 by transducer 20, and two perpendicular components of user-exerted force by transducer 22. An analog-to-digital converter 37 converts these analog electrical signals into digital signals for input into the microcomputer 23. The outputs of the microcomputer, the control signals for servo valves 13 and 14, are converted to analog electrical signals by digital-to-analog converters 38.

The microcomputer 23 also serves as a communication link between the user and the machine. A user console 24 is interfaced with the microcomputer and allows the user to request various exercise modes and specify various parameters which define the form of an exercise to be done. The user enters this information at the keyboard 25. The display panel 26 displays characters entered by the user, for verification, and displays messages concerning his performance in a previous exercise session, messages which guide him through an exercise program, or messages concerning error conditions or machine malfunctions. The operator console 27 provides for more complicated interactions with the microcomputer, such as input and output of user performance data and the trajectory teaching and force-curve teaching operations described earlier. A magnetic tape unit 30 serves as a storage medium for performance data and exercise program data for a large number of users of the machine. It may also serve to store data for use by control programs in addition to data stored in permanent computer memory. In particular, the tape unit will store the data resulting from trajectory teaching and force-teaching sessions. Any of this data may be printed out for inspection by the printer 29. Data and commands are entered on keyboard 28. An optional disk storage unit 31 provides for storage of much larger quantities of data, and allows much faster access to the data.

A digital display 41 is mounted near the end of the second link 2 by an adjustable bracket and serves to inform the user of the instantaneous level of force that he is exerting during exercise. This force indicated is normally the component of user-exerted force tangent to the specified trajectory. This force is computed by the microcomputer 23 and sent to the digital display 41 as a digital signal.

Referring now to FIG. 2, the microcomputer 23 is shown as two distinct units, the supervisory computer 70 and the direct-digital-control computer 71. This is a functional distinction rather than a physical distinction. The same computer 23 performs both functions by sharing its time between them. It would be possible, however, to use separate computers or microprocessors for these two tasks.

The supervisory task involves sampling at closely-spaced time intervals the measured values of link angular positions $\theta_1$ and $\theta_2$ and two components of the user exerted force F, $F_n$, and $F_t$ where $F_n$ represents the component of user exerted force F normal to the desired path and $F_t$ represents the component of user exerted force F tangent to the desired path. These measured values, along with programs and data defining the desired path which reside in computer memory, are used to compute commanded angular velocities $\dot{\theta}_{1c}$ and $\dot{\theta}_{2c}$ for the two links 1 and 2. These velocity commands are updated at closely-spaced time intervals in order to keep up with the changing state of the system. The computer makes use of recently sampled values of link angular positions $\theta_1$ and $\theta_2$ to approximate the present link angular velocities to a sufficient degree of accuracy.

The direct-digital-control task involves receiving the velocity commands $\dot{\theta}_{1c}$ and $\dot{\theta}_{2c}$ and enforcing them. The present velocity errors are computed as the difference between actual link angular velocities and commanded link angular velocities $\dot{\theta}_{1c}$ and $\dot{\theta}_{2c}$. These errors are then used by the computer to determine what corrections must be made to the electrical signals $e_1$ and $e_2$ in order to eliminate the errors between actual and commanded velocities. The signals $e_1$ and $e_2$ regulate the torque output of torque motors 72 and 73, which position servo valves 13 and 14 and thereby regulate the fluid flow rates into hydraulic cylinder 7 and 10. These servo valves are capable of regulating either flow or pressure to each end of the two cylinders 7 and 10 and thus serve to regulate either the velocities or the applied forces of the piston rods 35.

Figure 3:
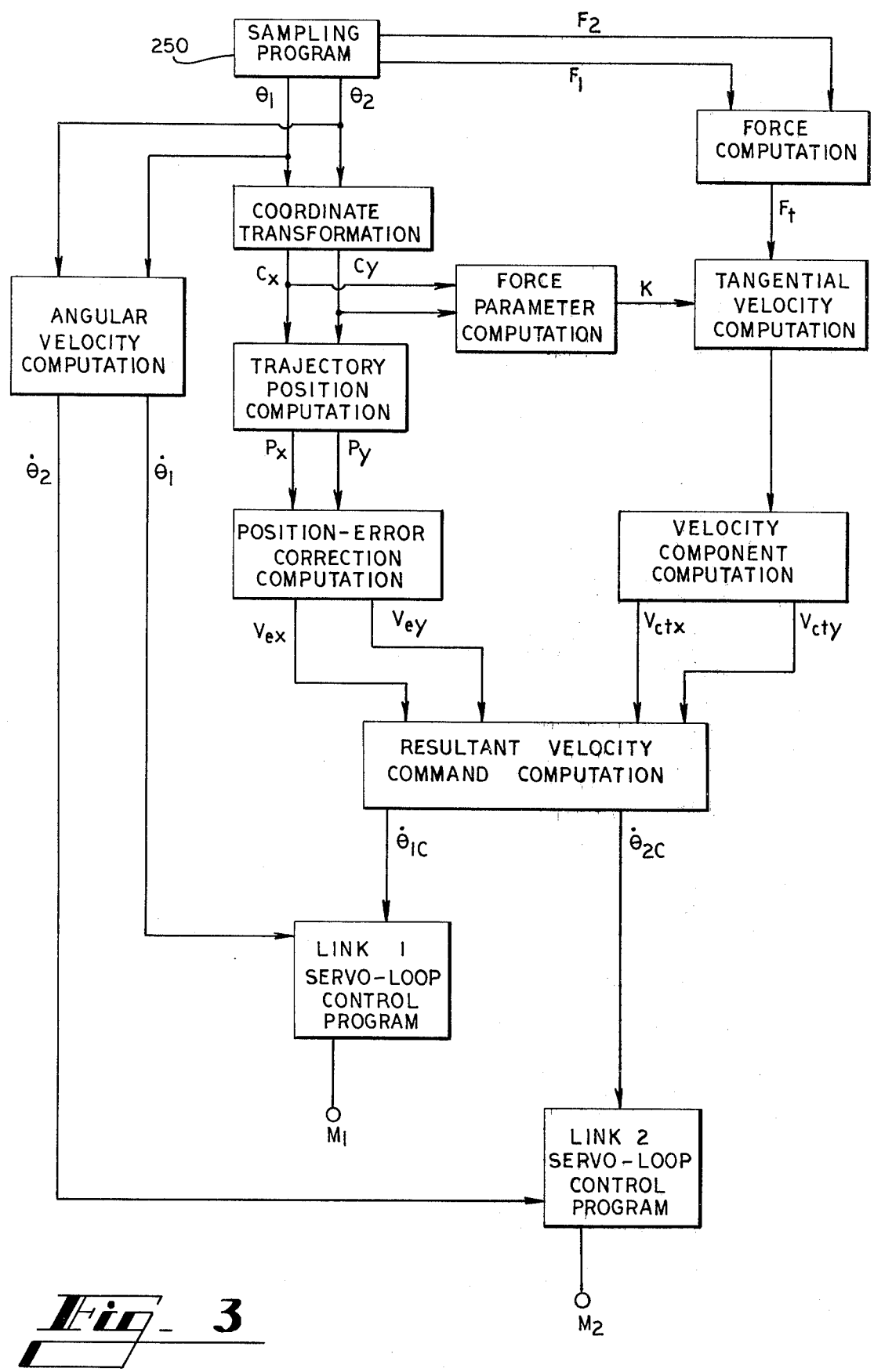
FIG. 3 is a block diagram illustrating the control procedure carried out by the computer according to the disclosed embodiment.

FIG. 3 is a block diagram which illustrates the overall structure and function of the computer software. Each block represents an individual program or module and the lines show the primary inputs and outputs of each program.

The sampling program 250 receives the present values of link positions and force transducer output from the computer's communication interface. These sampled values are then stored in computer memory locations where the values will be read by other programs. The values of link angular positon, $\theta_1$ and $\theta_2$, are then used, along with previous values of position, to compute the angular velocities $\dot{\theta}_1$ and $\dot{\theta}_2$, which are used by the servo-loop control programs.

The two components of force transducer output, $F_1$ and $F_2$, are used in coordinate transformation equations to compute $F_t$, the component of user-exerted force tangent to the specified trajectory.

The sampled link angular positions $\theta_1$ and $\theta_2$, are transformed into components of linear position, $C_x$ and $C_y$, in the horizontal and vertical directions. These coordinates give the location of the endpoint 32, (the point of interaction between the machine and the user). The position of the endpoint 32 relative to the specified trajectory is then determined. In order to correct for deviations of the endpoint from the specified trajectory, velocity components $V_{ex}$ and $V_{ey}$ are determined. These velocity components serve as an endpoint velocity command in the direction normal to the specified trajectory.

The endpoint coordinates $C_x$ and $C_y$ are also used, along with data stored in memory, to determine a force parameter K. The sampled coordinates $C_x$ and $C_y$ are used to compute approximately the line integral of displacement along the trajectory. A table of data in computer memory contains values of K, as well as position coordinates of points on the specified trajectory, for a large number of evenly-spaced values of this line integral. K is found in this table according to the present value of the line integral. This parameter, K, is responsible for the variation of resisting force with position along the specified trajectory. The K parameter is used along with $F_t$ to compute the commanded endpoint tangential velocity $V_{ct}$, which serves to specify the machine behavior and thus the form of the exercise.

$V_{ct}$ is then resolved into components in the horizontal and vertical directions, $V_{ctx}$ and $V_{cty}$. These components are then added vectorially to Vex and Vey to form the resultant commanded endpoint velocity. This velocity is then converted into the equivalent link-angular-velocity commands, $\dot\theta_{1c}$ and $\dot\theta_{2c}$. The equations used to compute link-angular-velocity are:

$$\dot\theta_2 = \frac{C_x\dot C_x + C_y\dot C_y}{\sqrt{(C_x^2 + C_y^2)(L^2 - \frac{C_x^2 + C_y^2}{4})}}$$

For $\theta_1 \geqq \phi_2$ (Negate for $\theta < \phi_2$)

$$\dot\theta_1 = \frac{-\dot\theta_2}{2} + \frac{C_x\dot C_y - C_y\dot C_x}{C_x^2 + C_y^2}$$

where
$C_x$ is horizontal component of endpoint position
$C_y$ is vertical component of endpoint position
$\dot C_x$ is horizontal component of endpoint velocity
$\dot C_y$ is vertical component of endpoint velocity
L is length of each link 1 and 2 of the machine (both links are of the same length)
$\theta_1$ is angular position of link 1, measured from the horizontal plane
$\phi_2$ is the angle between the horizontal plane and the line segment extending from hinge joint 5 to the user interaction point and lying in the plane in which links 1 and 2 move. The differences between the commanded angular velocities and the actual angular velocities $\dot\theta_1$ and $\dot\theta_2$ are used by the two servo-loop control programs to compute $M_1$ and $M_2$, the values of voltage to be supplied to the torque motors 72 and 73 of the electrohydraulic servo-valves. $M_1$ and $M_2$ are computed from a proportional-integral derivative algorithm, which is well known to thosed skilled in the art of control system engineering.

The computer 23 also serves to monitor the performance of the machine so that malfunctions may be detected. Monitoring is done indirectly by checking for excessively high errors in link angular velocities and for excessively high rates of increase in these errors. If malfunctions are detected the computer will send a digital signal to digital switch 74 causing this switch to open and break the circuit supplying electrical current to four safety-shut-off valves 15 and 16. These valves are normally closed, spring loaded, and solenoid operated, requiring continuous solenoid current to remain open. When closed, these valves block the flow of fluid into and out of the cylinders 7 and 10, locking the linkage in its present position and thereby preventing possible injury to the user.

The primary elements of the hydraulic power supply 18 are also shown in FIG. 2. These are: a fixed delivery vane pump 75, a tank 76, a pilot-operated unloading valve 77, a check valve 79, two safety relief valves 78 and 80, and an accumulator 19.

FIGS. 4a–4g are illustrations of the machine in use for various exercise motions. FIG. 4a shows the user 50 performing the familiar curl exercise, but the path of motion 51 may assume any shape or curvature desired. FIG. 4b shows an overhead press exercise with an individually tailored path of motion 52. FIG. 4c shows a bench press exercise. FIG. 4d shows an overhead pull exercise. FIG. 4e shows a high-intensity leg press exercise using foot plate attachment 56 and adjustable chair 55. FIG. 4f shows a leg-extension exercise using a padded attachment 58 which contacts the front of the user's lower leg and the upper surfaces of his feet. The path of motion 57 is circular with a radius and a center point exactly matched to the user's physical dimensions. FIG. 4g shows an exercise motion designed for involvement of both arms and legs over a long path of motion 59. These exercises shown are only a few of the infinite number of those possible with this robotic exercise machine.

In operation, the mechanism, hardware and software of the embodiment previously described, and of alternative embodiments to be described later, combine to provide a multitude of varying exercise modes. One such exercise mode is the non-inertial, positive-negative, speed limited exercise mode. The non-inertial positive-negative speed-limited exercise mode, (abbreviated NPNS), is expected to provide the most effective and widely used form of skeletal-muscle exercise. It is called "non-inertial" because, unlike exercise done with weights, the velocity of the bar, or other means of contact with the user, does not increase with time when the user exerts a constant force on the bar. The bar, or endpoint, reacts according to the forces presently being applied, and its velocity is not affected by the time-history of user-exerted forces.

It is called "positive-negative" because the direction of the resisting force will not be affected by the direction of movement of the endpoint. As with any exercise mode available on this machine, NPNS exercise will be carried out in accordance with selected "force-curves" designed to vary the resisting force according to the strength potential of the user at any position along the path of motion.

The speed at which the endpoint moves along a specified trajectory is proportional to the component of user-exerted force along this trajectory. An exception to this rule occurs when the force exceeds some limit or drops below some limit, in which case the speed will be held constant. The purpose of these speed restrictions is to insure that low-speed "isotonic" exercise is actually being done when a particular exercise program calls for this type of exercise.

The NPNS exercise mode is extremely flexible. All parameters involved can be adjusted by the user at the operator's console 24. By adjusting certain force parameters, to be described next, the form of the exercise can range from the slowest isotonics to high-speed isokinetics, and from very heavy resistance to the lightest resistance.

Symbol definitions:
 $F_t$ component of user-exerted force tangent to specified trajectory at present position
 $V_t$ component of endpoint velocity tangent to specified trajectory at present position
 ST abbreviation for "specified trajectory"
 $F_{m1}$ level of user-exerted force required to keep the endpoint stationary others—see FIG. 5.

Figure 5:
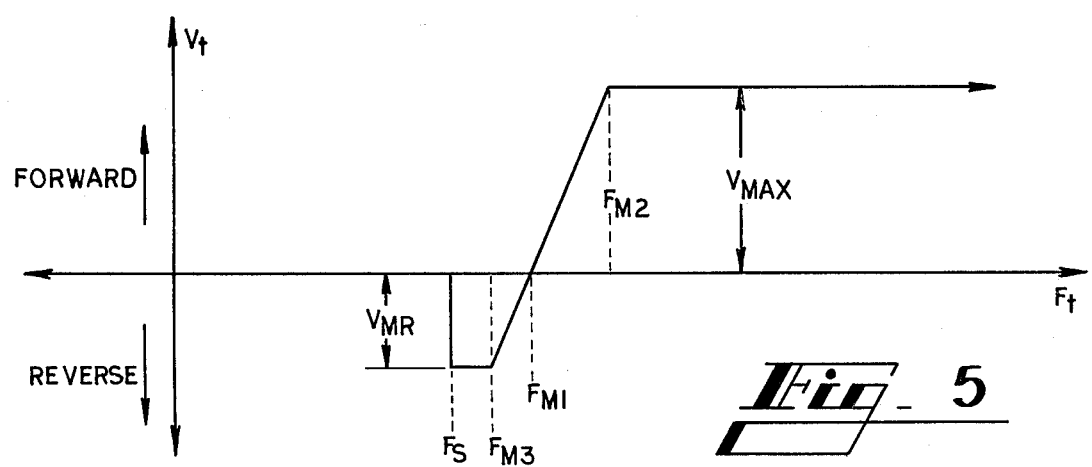
FIG. 5 is a representative plot of tangential velocity vs. tangential force for the Non-inertial, positive-negative, speed-limited (NPNS) exercise mode.

The sharp corners of the plot of FIG. 5 represent unrealistic, abrupt changes in velocity, that is, large accelerations, and result from the simplifications necessary to represent a 3-dimensional process in two dimensions. The neglected dimension is time. Large accelerations will be prevented, even when this necessitates overriding the basic control scheme.

The tangential-velocity update program which is responsible for producing NPNS exercise will consist of the following procedures.

1. React to user-exerted forces

Move forward, (along ST), only if the component of user-exerted force tangent to the trajectory exceeds a specified minimum, $F_{m1}$. Begin forward movement with velocity $V_t$ slightly greater than 0 when $F_t$ exceeds $F_{m1}$. Increase the velocity linearly as $F_t$ increases, reaching the specified maximum velocity $V_{max}$ when $F_t = F_{m2}$. If $F_t$ increases beyond $F_{m2}$, the velocity will remain at $V_{max}$.

If $F_t$ is below $F_{m1}$ the endpoint will move in the reverse direction, against the opposing force of the user. (This is negative exercise). When $F_t$ drops slightly below $F_{m1}$ the velocity $V_t$ will have a small negative value. As $F_t$ becomes smaller, $V_t$ will increase in magnitude. A maximum reverse speed $V_{mr}$ will be reached when $F_t = F_{m3}$. If $F_t$ drops below $F_{m3}$ the velocity will remain at $V_{mr}$. If $F_t$ drops below a value $F_s$ the machine will abruptly stop. A value of $F_t$ below $F_s$ will be an indication of either of the two conditions:

1. The user is not exerting enough force on the machine to obtain some minimum intensity of exercise.

2. The user has lost contact with the machine, either by intentionally releasing his grip or by losing his grip due to muscle exhaustion or accident.

2. Prevent the endpoint from moving beyond some specified points at the extreme ends of the specified trajectory. Check to see if deceleration must begin in order to stay within these limits. (Decision based on present position and velocity)

3. Keep accelerations below the level which would be harmful to the user. This is especially important when the machine is initially moved from a stationary position.

4. Variation of forces with position along ST.

The forces $F_{m1}$, $F_{m2}$, $F_{m3}$, and $F_s$ will be shifted as the endpoint moves along the ST, in accordance with the user's strength-potential curve. This shifting of forces will result in either an increase or decrease in the apparent "weight", or resistance to motion, of the machine as perceived by the user.

The force parameter K is the ratio of tangential user-exerted force $F_t$ to the average value of $F_t$ over a ST. The forces $F_t$ are those sampled during the previously described force teaching process. A table of values of K is formed during the force-teaching process described earlier. The correct value of K is obtained from this table according to the present value of the line integral of displacement along the trajectory, as was described earlier. A nominal force, $F_{NOM}$, is specified by the user at the user's console before an exercise set begins. The shifted forces are computed as follows:

$$F_{M1} = KF_{NOM} \quad F_{M2} = C_2 F_{M1}$$

$$F_{M3} = C_3 F_{M1} \quad F_S = C_S F_{M1}$$

where $C_2$, $C_3$, and $C_S$ are parameters which may either be specified by the user or assume standard values.

5. Allow for increasing or decreasing the apparent "weight" on the reverse (negative) portion of the exercise. If desired, the level of user-exerted force required to keep the endpoint moving at any given speed during negative exercise may be increased by some specified percentage beyond that which would be required during positive exercise. These force levels may also be decreased during the negative portion of the exercise.

6. The linkage must move into a specified starting position at or near the extreme end of the ST before an exercise set can begin. This will be accomplished by a subroutine designed specifically for this purpose.

Among the many other possible exercise modes attainable with this machine according to the present invention are:

a. Non-inertial exercise (Velocity is not proportional to the time integral of applied force.)

b. Inertial exercise (weight simulation)

c. Endurance-oriented exercise (Resisting force decreases either with time or according to the recent performance of the user.)

d. Positive-negative exercise (Force exerted on the user by the machine is in the same direction regardless of the direction of movement.)

e. Positive-positive exercise (Force exerted on the user by the machine is in the opposite direction during the reverse stroke from that during the forward stroke.)

f. Speed-limited exercise (The speed of movement is not allowed to exceed some specified limit.)

g. Active machine mode (The machine forces the user's arms or legs to follow a specified path of motion, even if the user exerts no force on the machine.)

In any of the above exercise modes, except for g, the resisting force provided by the machine can be made to vary with position along a specified trajectory according to the user's strength-potential curve.

Figure 6:
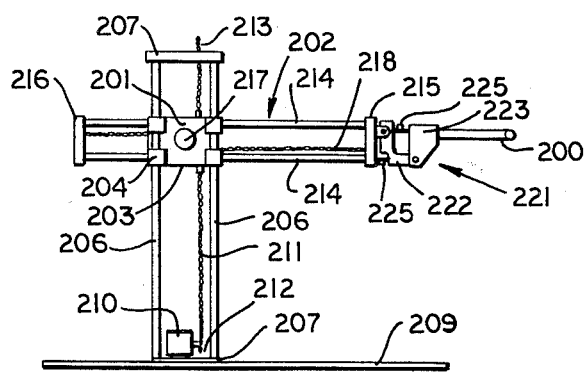
FIG. 6 shows a side view of a preferred alternative embodiment of the invention.
Figure 8:
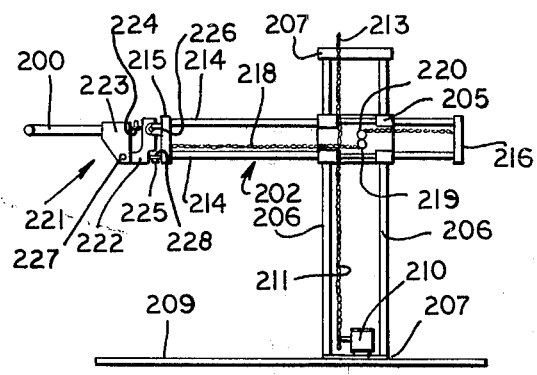
FIG. 8 is an opposite side view of the embodiment as in FIG. 6.

An alternative mechanical configuration of the robotic exercise machine is illustrated in FIGS. 6, 7 and 8. In this configuration, two links 201, 202 move along straight-line paths to produce exercise motions similar to those of the configuration previously described. The user-interaction attachment 200 can move along any path within a large rectangular planar region.

The first link 201 consists of a plate 203 and two sets of ball bushings, 204 and 205. Link 201 moves along a pair of vertical ways 206, which are rigidly connected to a pair of end plates 207. These end plates are rigidly connected to a supporting frame 208, to which a platform 209 is attached. The vertical ways 206 serve as a guideway along which the set of four ball bushings 204 move. A hydraulic motor 210 drives link 201 along the vertical ways 206. A drive sprocket 212 on the shaft of motor 210 drives a roller chain 211 in either of two directions. One end of the chain is connected to the bottom of plate 203. The chain extends downward, wraps around drive sprocket 212, then extends upward to the top of the frame 208, wraps around idler sprocket 213, and then extends downward to connect with the top of plate 203.

A second link 202 is connected to the first link 201 by means of a set of four ball bushings 205. This arrangement allows link 202 to move along a straight path in the horizontal direction relative to link 201. This second link consists of a pair of horizontal ways 214 connected at each end by end plates 215 and 216. A second hydraulic motor 217 is mounted on plate 203 and drives link 202 in a straight-line motion relative to link 201. A roller chain 218 transmits power from motor 217 to link 202. A drive sprocket 219 is mounted on the shaft of motor 217. An idler sprocket 220 is mounted directly above the drive sprocket. The roller chain 218 is connected at one end to end plate 215 and extends horizontally to drive sprocket 219. It wraps around the drive sprocket and then around idler sprocket 220. From there it extends horizontally to connect with end plate 216.

A two-component force transducer 221 is mounted on end plate 215. This transducer consists of two links 222 and 223, two rods 224 and 228, and two strain gauges 225. Link 222 is connected to end plate 215 by a hinge joint 226 and by rod 228. Link 223 is connected to link 222 by hinge joint 227 and by rod 224. Strain gauges 225 are mounted on rods 224 and 228. The user interaction attachment 200 is mounted on link 223 so that the point of application of user-exerted forces and the center of hinge joint 226 lie on a common line parallel to horizontal ways 214. The result of this arrangement is that the horizontal component of user-exerted forces produces a moment about hinge joint 227 but not about hinge joint 226, allowing the horizontal component of user-exerted force to be isolated from the vertical component. The values of strain in the rods 224 and 228, as indicated by the strain gauges, are used in a pair of simple algebraic equations to yield the horizontal and vertical components of user-exerted force.

The control system and manner of operation of this alternative configuration of FIG. 5 is identical to that described previously. The primary difference is that two coordinated linear motions replace two coordinated angular motions, and two hydraulic motors replace two hydraulic cylinders. An important advantage of this alternative configuration is that the need for transformations between angular coordinate frames and rectangular coordinate frames in the central algorithms is eliminated, thereby reducing the execution time of the programs and improving the quality of control. Another advantage is that the two links 201 and 202 are dynamically independent, that is, acceleration of one link has no significant effect on the motion of the other link.

Figure 9A:
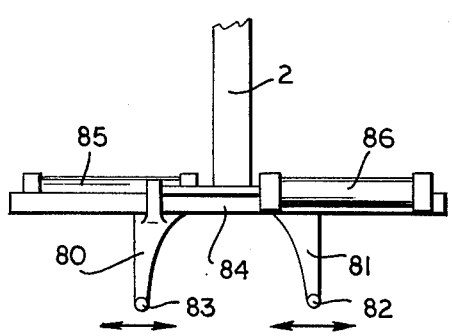
FIGS. 9a, b, c and d show some alternative embodiments of the present invention.
Figure 9C:
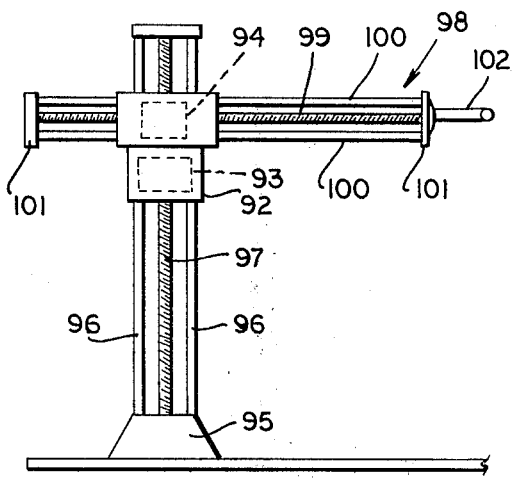
Figure 9B:
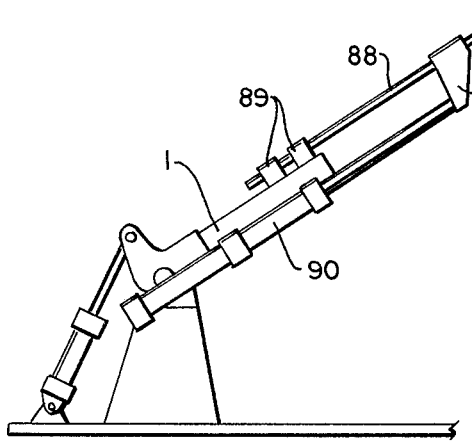

FIGS. 9a–9c show still some more alternative mechanical configurations of the invention. FIG. 9a shows two additional links 80 and 81 which are attached to a guideway 84 by ball bushings or rollers so that they move in a straight line relative to link 2. The guideway 84 is rigidly attached to link 2. The links 80 and 81 are driven relative to the guideway 84 by hydraulic cylinders 85 and 86. Cylinder 85 is located below guideway 84, and cylinder 86 is located above the guideway. A pair of attachments 82 and 83 are located at the ends of links 80 and 81 for interaction with the user. This arrangement converts the apparatus shown in FIG. 1 into a machine capable of providing 3-dimensional exercise motions. The control system is expanded to control the velocities of links 80 and 81 as well as those of links 1 and 2.

The configuration of FIG. 9b is similar to the embodiment of FIG. 1 except that the second link takes the form of a link 87 which moves in a straight line relative to link 1, instead of a rotary motion. Link 87 is guided by a rod 88 which is attached to link 1 by means of ball bushing mounts 89. Link 87 is driven in a straight-line motion relative to link 1 by hydraulic cylinder 90, which is mounted rigidly to the side of link 1. A removable attachment 91 is mounted at the end of link 87, for interaction with the user. This machine is capable of motions similar to those of the preferred embodiment.

FIG. 9c shows a machine, similar to that in FIG. 6, which makes use of two linear motions to achieve a range of movement comparable to that of the embodiment of FIG. 1. The first link 92 includes a double motor housing, which houses motors 93 and 94. The frame is comprised of a base 95, a group of two or more guide rods 96 and a screw shaft 97. Motor 93 rotates about screw shaft 97, turning a ball-screw about screw shaft 97, which causes first link 92 to be driven upward relative to the described frame. Motor 94 is offset from motor 93 to allow screw-shaft 97 and guide rods 96 to pass through first link 92. The second link 98 includes a screw-shaft 99, a group of two or more guide rods 100, two end plates 101, and a removable attachment 102 for interaction with the user. This second link is driven in a straight line relative to housing 92 by motor 94, which turns a ball-screw about screw-shaft 99.

Figure 9D:
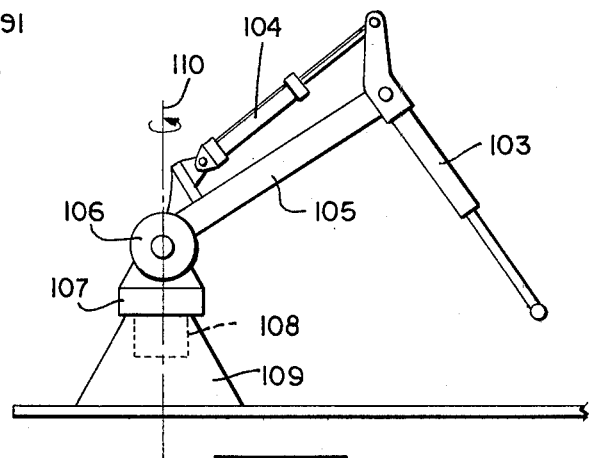

FIG. 9d shows a configuration capable of 3-dimensional motion and intended for use in pairs, one machine for a right body limb, a second machine for a left body limb. The third link 103 is identical to that of link 2 of the preferred embodiment and is driven in a rotary motion relative to link 105 by hydraulic cylinder 104. The second link 105 is driven in a rotary motion relative to the first link 107 by a hydraulic motor 106. The first link 107 is attached to frame 109 by a hinge joint allowing link 107 to rotate relative to frame 109 about an axis 110 perpendicular to the axis of rotation of link 105. Link 107 is driven by hydraulic motor 108.

It is to be understood that while a preferred embodiment and several alternative configurations have been illustrated and described herein, other alternative configurations or modifications thereof may occur to those having skill in the related arts and what is intended to be covered herein is not only the illustrated form of the invention, but also any and all modified forms thereof as may come within the scope and spirit of this invention as herein before described and defined in the appended claims.

What is claimed is:

1. A programmable exercise machine for defining and recording an exercise path comprising:

a rigid frame;

at least two links connected to one another and attached at at least one point to said rigid frame, said links being movable relative to one another and to said rigid frame;

user interaction means attached to one of said links for contacting a body part of the user and for receiving user-exerted forces so as to be movable to any desired position in at least two degrees of freedom relative to said frame;

independent powering means associated with each link, each said powering means being operative to drive said associated link in a predetermined path of motion relative to said other links and to said frame and exerting resisting forces to oppose said user-exerted forces; and automatic control means operative to receive and store signals corresponding to magnitude and direction of an arbitrary user-defined exercise path in said two degrees of freedom, and further operative for controlling said powering means in response to said stored signals to define movement of said user interaction means along said path in response to the magnitude and direction of said user-exerted force.

2. Exercise machine of claim 1 and wherein said automatic control means comprises:

position sensing means for sensing the positions of said movable links relative to one another and to said rigid frame, said position sensing means producing a signal representing said position;

magnitude sensing means for sensing the magnitudes of said user-exerted forces in at least one direction, said magnitude sensing means producing a signal representing said magnitudes; and a computer for computing relative velocities of said links by using said position and magnitude signals and for signalling commands to said powering means thus controlling the output of said powering means.

3. Machine of claim 2 and further including a visual display means responsive to said computer to inform the user of the instantaneous level of force which he is exerting.

4. Exercise machine of claim 2 and further including one control loop for each of said links, each said control loop comprising a feedback controller responsive to said commands to control said independent powering means.

5. The exercise machine of claim 2 and further including velocity sensing means for providing velocity signals in response to the velocities of said links relative to one another and to said frame; and wherein said computer is responsive to said velocity signals for controlling said powering means.

6. Exercise machine of claim 1 and further including safety shut-off means operatively associated with said powering means, said shut-off means being operative to turn off said power means in response to the detection of machine malfunctions.

7. Method of controlling skeletal-muscle exercises as said exercises are performed by a user applying force to a user interaction point of an exercise machine, said method comprising the steps of:
 moving the user interaction point a first time along a specified trajectory by applying a first user exerted force;
 storing said specified trajectory;
 measuring the magnitude of the first user exerted force at a plurality of positions of the user interaction point along the specified trajectory;
 storing said magnitude of the first user exerted force;
 moving the user interaction point a second time along the specified trajectory in response to said stored trajectory by applying a second user exerted force; and
 applying a machine exerted resistance force opposite in direction to the second user-exerted force and in response to the stored magnitude of the first user exerted force at each of said plurality of positions of the user interaction point along the specified trajectory.

8. A user programmable exercise machine for defining and recording an exercise path, comprising:
 a rigid frame;
 movable means movably connected to said frame and operative to assume any desired position within a predetermined region of at least two dimensions;
 position sensing means operative in response to the user-defined position of said movable means to provide location signals corresponding to said position of said exercise path within said predetermined region;
 signal storage means operative to receive and store said location signals while said movable means is freely moved along an arbitrary user-defined path within said region; and
 motive means operatively coupled to said movable means to drive said movable means to any position within said region, and operatively controlled in response to said stored location signals to constrain said movable means to move only along said user-defined path in response to manual force applied to said movable means.

9. The exercise machine of claim 8 and further including means for providing velocity signals in response to the velocity of said movable means relative to said frame; and wherein said motive means is responsive to said velocity signals for controlling the velocity of said movable means in response to applied manual force.

10. Exercise machine of claim 8 and wherein said movable means comprises a plurality of differently constructed removable attachments, each of said attachments being alternatively mountable on said movable means, each of said attachments being designed to contact a different body part of the user.

11. The exercise machine of claim 8 and further comprising:
 sampling means for periodically providing a current sample of magnitude and direction of said manually applied force; and
 whereby said sampling means controls said motive means in response to said current sample of said magnitude and said direction of said manually applied force, independently of former samples of said magnitude and said direction of said manually applied force.

12. Apparatus as in claim 8, further comprising:
 force sensing means operative in response to the amount of force manually applied to said movable means while said movable means is manually moved along said defined path to provide force signals corresponding to said applied force at selected positions along said selected path;
 signal storage means operative to receive and store said force signals; and wherein
 said motive means is operative in response to said stored force signals to urge said movable means in opposition to said manually applied force, at a level of opposing force that is a function of the previously applied force at said selected positions along the selected path.

13. Apparatus as in claim 8, wherein:
 said motive means is operative to constrain said movable means to move along said arbitrarily defined path only in response to manual force applied to said movable means in a direction tangential to said path.

14. A programmable exercise machine for defining and recording an exercise path, comprising:
 a rigid frame;
 movable means movably connected to said frame and operative to assume any desired position within a predetermined region of at least two dimensions;
 position sensing means operative in response to the actual position of said movable means to provide location signals corresponding to said actual position of said movable means within said predetermined region;
 signal storage means operative to receive and store desired location signals corresponding to an arbitrarily defined path within said region; and
 motive means operatively coupled to said movable means to drive said movable means to any position within said region, and operatively controlled in response to said desired location signals and said actual location signals to constrain said movable means to move only along said arbitrarily defined path in response to manual force applied to said movable means.

15. Apparatus as in claim 14, further comprising:
 force sensing means operative in response to the amount of force manually applied to said movable means to provide force signals corresponding to said applied force at selected positions along said defined path;

means operative to provide opposing force signals corresponding to an arbitrarily defined amount of desired opposing force in a direction tangent to the defined path at said selected positions; and wherein said motive means is operative in response to said desired force signals and said applied force signals to permit said movable means to move along said defined path only when the manually applied force at each selected position exceeds the desired opposing force at such positions.

16. Apparatus as in claim 15, wherein:

said motive means is operative to permit movement of said movable means in a first direction along said defined path when the manually applied force exceeds the desired force, and is further operative to move said movable means along the defined path in a second direction opposite to said first direction when the desired force exceeds said manually applied force.

17. A user programmable exercise machine for defining and recording an exercise path, comprising:

a rigid frame;

movable means movably connected to said frame and operative to assume any desired position within a predetermined region of at least two dimensions;

position sensing means operative in response to the user-defined position of said movable means to provide location signals corresponding to the actual position of said exercise path within said predetermined region;

signal storage means operative to receive and store location signals corresponding to an arbitrary user-defined path within said region; and constraining means coupled to said movable means and operative in response to said stored location signals to constrain said movable means to move only along said user-defined path in response to manual force applied to said movable means.

18. A programmable exercise machine for defining and recording an exercise path, comprising:

a rigid frame;

movable means movably connected to said frame and operative in the absence of constraint to assume any desired position within a predetermined region of at least two degrees of freedom;

position sensing means operative in response to the actual position of said movable means to provide location signals corresponding to said actual position of said movable means within said predetermined region;

signal storage means operative to receive and store desired location signals corresponding to a defined path within said region; and constraining means coupled to said movable means and operative in response to said desired location signals and said actual location signals to inhibit manual movement of said movable means in any direction other than a direction tangent to said defined path.

19. The method of defining and controlling an exercise through manual force applied to a user interaction point of an exercise machine, comprising the steps of:

manually moving the user interaction point a first time to define an arbitrary exercise path within a predetermined region having at least two degrees of freedom;

storing said defined exercise path; and then manually moving the user interaction point a second time while applying a machine exerted force to said user interaction point in response to said stored exercise path to inhibit the user interaction point from movement to a location not along said defined exercise path.

20. The method as in claim 19, further comprising:

applying a machine exerted resistance force to said user interaction point in opposition to said manual movement along said defined exercise path, the magnitude of said resistance force being a function of the location of the user interaction point along the defined exercise path.

21. The method of defining and controlling an exercise through manual force applied to a user interaction point of an exercise machine, said user interaction point initially capable of assuming any desired position within a region having at least two degrees of freedom, comprising the steps of:

defining an arbitrary exercise path to be followed by said user interaction point within said region;

storing said defined exercise path; and then manually moving said user interaction point along said arbitrarily defined path while applying a machine exerted force to said point in response to said stored exercise path to constrain the manual movement to movement along said path.

22. The method of claim 21, wherein manual movement of said user interaction point is machine constrained to movement only in response to manual force applied to said point in a direction tangent to said defined path.

* * * * *